United States Patent
Elazar et al.

(10) Patent No.: US 8,839,005 B2
(45) Date of Patent: Sep. 16, 2014

(54) APPARATUS FOR TRANSFERRING LICENSED DIGITAL CONTENT BETWEEN USERS

(75) Inventors: Gidon Elazar, Foster City, CA (US);
Dan Harkabi, Foster City, CA (US);
Nehemiah Weingarten, Foster City, CA (US)

(73) Assignee: SanDisk Technologies Inc., Plano, TX (US)

( * ) Notice: Subject to any disclaimer, the term of this patent is extended or adjusted under 35 U.S.C. 154(b) by 1015 days.

(21) Appl. No.: 11/531,455

(22) Filed: Sep. 13, 2006

(65) Prior Publication Data

US 2008/0065911 A1    Mar. 13, 2008

(51) Int. Cl.
*G06F 12/14*     (2006.01)
*G06Q 30/06*     (2012.01)
*G06F 21/10*     (2013.01)

(52) U.S. Cl.
CPC ........ *G06Q 30/06* (2013.01); *G06F 2221/0786* (2013.01); *G06F 21/10* (2013.01)
USPC ...................................................... 713/194

(58) Field of Classification Search
CPC ......... G06F 21/86; G06F 21/10; G06F 21/72; G06F 2221/2107; G06F 2221/2143
USPC ....................................................... 713/194
See application file for complete search history.

(56) References Cited

U.S. PATENT DOCUMENTS

| | | |
|---|---|---|
| 4,634,807 A | 1/1987 | Chorley et al. |
| 4,757,302 A | 7/1988 | Hatakeyama et al. |
| 5,446,896 A | 8/1995 | Hegarty et al. |
| 5,450,489 A | 9/1995 | Ostrover et al. |
| 5,530,235 A | 6/1996 | Stefik et al. |
| 5,715,403 A | 2/1998 | Stefik |
| 5,825,879 A | 10/1998 | Davis |
| 5,847,698 A | 12/1998 | Reavey et al. |

(Continued)

FOREIGN PATENT DOCUMENTS

| | | |
|---|---|---|
| DE | 19820479 A1 | 12/1999 |
| EP | 1304665 A2 | 4/2003 |

(Continued)

OTHER PUBLICATIONS

Kim, Won et al., "Object-Oriented Concepts, Databases, and Applications," New York, New York: ACM Press, 1989, ISBN 0-201-14410-7, pp. 4-5.

(Continued)

*Primary Examiner* — Eleni Shiferaw
*Assistant Examiner* — Nelson Giddins
(74) *Attorney, Agent, or Firm* — Brinks Gilson & Lione (57) ABSTRACT

Techniques are described for reselling digital data content, such as books, other types of documents, music, video, software and games. Such data are stored in a small portable digital rights management (DRM) device, such as a non-volatile memory card or flash drive, along with a license that defines the extent of the use permitted of the data. The content and license data are processed by a microprocessor that is included in the memory card or flash drive, including modification of the license in response to the data content being resold and transferred to another memory card or flash drive. The process is a digital version of selling a book, CD, DVD or the like in a second-hand market.

23 Claims, 5 Drawing Sheets

(56) References Cited

U.S. PATENT DOCUMENTS

| | | | |
|---|---|---|---|
| 5,887,269 A | 3/1999 | Brunts et al. | |
| 5,956,034 A | 9/1999 | Sachs et al. | |
| 5,982,891 A | 11/1999 | Ginter et al. | |
| 5,991,399 A | 11/1999 | Graunke et al. | |
| 6,009,525 A | 12/1999 | Horstmann | |
| 6,022,223 A | 2/2000 | Taniguchi et al. | |
| 6,055,314 A | 4/2000 | Spies et al. | |
| 6,118,116 A | 9/2000 | Sawada et al. | |
| 6,226,618 B1 | 5/2001 | Downs et al. | |
| 6,314,409 B2 | 11/2001 | Schneck et al. | |
| 6,351,547 B1 | 2/2002 | Johnson et al. | |
| 6,418,421 B1 | 7/2002 | Hurtado et al. | |
| 6,529,949 B1 | 3/2003 | Getsin et al. | |
| 6,546,193 B1 | 4/2003 | Um et al. | |
| 6,550,011 B1 | 4/2003 | Sims, III | |
| 6,598,164 B1 | 7/2003 | Shepard | |
| 6,611,358 B1 | 8/2003 | Narayanaswamy | |
| 6,636,773 B1 | 10/2003 | Tagawa et al. | |
| 6,697,944 B1 | 2/2004 | Jones et al. | |
| 6,732,275 B1 | 5/2004 | Dimenstein | |
| 6,738,614 B1 | 5/2004 | Blankenship et al. | |
| 6,738,905 B1 | 5/2004 | Kravitz et al. | |
| 6,757,749 B2 | 6/2004 | Aoki et al. | |
| 6,824,051 B2 | 11/2004 | Reddy et al. | |
| 6,876,984 B2 | 4/2005 | Tadayon et al. | |
| 6,886,036 B1 | 4/2005 | Santamaki et al. | |
| 6,907,585 B2 | 6/2005 | Kohno | |
| 6,922,725 B2 | 7/2005 | Lamming et al. | |
| 6,944,600 B2 | 9/2005 | Stefik et al. | |
| 6,973,445 B2 | 12/2005 | Tadayon et al. | |
| 6,974,076 B1 | 12/2005 | Siegel | |
| 6,983,367 B2 | 1/2006 | Go et al. | |
| 7,023,572 B2 | 4/2006 | Tuli | |
| 7,039,615 B1 * | 5/2006 | Gajjala et al. | 705/59 |
| 7,058,818 B2 | 6/2006 | Dariel | |
| 7,068,381 B1 | 6/2006 | Tuli | |
| 7,068,387 B2 | 6/2006 | Ahne et al. | |
| 7,213,004 B2 | 5/2007 | Hars et al | |
| 7,225,340 B2 | 5/2007 | Asahi et al. | |
| 7,249,105 B1 | 7/2007 | Peinado et al. | |
| 7,257,309 B1 | 8/2007 | Elswick et al. | |
| 7,296,098 B2 | 11/2007 | Shih | |
| 7,305,366 B2 * | 12/2007 | Chase et al. | 705/59 |
| 7,313,814 B2 | 12/2007 | Zhu et al. | |
| 7,350,228 B2 | 3/2008 | Peled et al. | |
| 7,353,541 B1 * | 4/2008 | Ishibashi et al. | 726/26 |
| 7,769,880 B2 * | 8/2010 | Paka et al. | 709/231 |
| 7,861,312 B2 * | 12/2010 | Lee et al. | 726/27 |
| 7,925,591 B2 * | 4/2011 | Gajjala et al. | 705/59 |
| 2001/0013021 A1 | 8/2001 | Saito | |
| 2002/0026424 A1 | 2/2002 | Akashi | |
| 2002/0099955 A1 | 7/2002 | Peled et al. | |
| 2002/0112172 A1 | 8/2002 | Simmons | |
| 2002/0141499 A1 | 10/2002 | Goertzen | |
| 2002/0152172 A1 | 10/2002 | Hars et al. | |
| 2002/0176575 A1 | 11/2002 | Qawami et al. | |
| 2002/0184156 A1 | 12/2002 | Tadayon et al. | |
| 2002/0186842 A1 | 12/2002 | Sabet-Sharghi et al. | |
| 2002/0196364 A1 | 12/2002 | Hendricks | |
| 2003/0018582 A1 | 1/2003 | Yaacovi | |
| 2003/0167236 A1 | 9/2003 | Stefik et al. | |
| 2003/0225701 A1 | 12/2003 | Lee et al. | |
| 2004/0010467 A1 * | 1/2004 | Hori et al. | 705/50 |
| 2004/0039932 A1 | 2/2004 | Elazar et al. | |
| 2004/0136536 A1 | 7/2004 | Michtchenko | |
| 2004/0137664 A1 | 7/2004 | Elazar et al. | |
| 2004/0193546 A1 * | 9/2004 | Tokutani et al. | 705/59 |
| 2004/0193744 A1 | 9/2004 | Paley et al. | |
| 2004/0205453 A1 | 10/2004 | Mortensen | |
| 2004/0260716 A1 * | 12/2004 | Sugiura | 707/102 |
| 2005/0004875 A1 | 1/2005 | Kontio et al. | |
| 2005/0044330 A1 | 2/2005 | Elazar et al. | |
| 2005/0061873 A1 | 3/2005 | Pirillo | |
| 2005/0065891 A1 * | 3/2005 | Lee et al. | 705/59 |
| 2005/0149450 A1 | 7/2005 | Stefik et al. | |
| 2005/0230483 A1 | 10/2005 | Miller et al. | |
| 2005/0230484 A1 | 10/2005 | Cuellar et al. | |
| 2005/0289072 A1 | 12/2005 | Sabharwal | |
| 2006/0010500 A1 | 1/2006 | Elazar et al. | |
| 2006/0080535 A1 | 4/2006 | Elazar et al. | |
| 2006/0084287 A1 | 4/2006 | Miller et al. | |
| 2006/0107330 A1 * | 5/2006 | Ben-Yaacov et al. | 726/26 |
| 2006/0167814 A1 * | 7/2006 | Peinado et al. | 705/59 |
| 2006/0167815 A1 * | 7/2006 | Peinado et al. | 705/59 |
| 2006/0253620 A1 * | 11/2006 | Kang | 710/36 |
| 2007/0027814 A1 * | 2/2007 | Tuoriniemi | 705/59 |
| 2007/0198430 A1 * | 8/2007 | Takahashi et al. | 705/59 |
| 2007/0229393 A1 * | 10/2007 | Ishii et al. | 345/1.1 |
| 2007/0255659 A1 * | 11/2007 | Yen et al. | 705/51 |
| 2007/0265977 A1 * | 11/2007 | Read | 705/59 |
| 2008/0065552 A1 | 3/2008 | Elazar et al. | |
| 2008/0103983 A1 * | 5/2008 | Jang et al. | 705/75 |
| 2008/0320605 A1 * | 12/2008 | Ben-Yaacov et al. | 726/28 |

FOREIGN PATENT DOCUMENTS

| | | | |
|---|---|---|---|
| EP | 1 376 309 A | 1/2004 | |
| GB | 2367925 A | 4/2002 | |
| WO | WO 98/42098 A1 | 9/1998 | |
| WO | WO 01/13199 A1 | 2/2001 | |
| WO | WO 01/23980 A1 | 4/2001 | |
| WO | WO 01/69354 | 9/2001 | |
| WO | WO 01/93000 A2 | 12/2001 | |
| WO | WO 03/036975 | 5/2003 | |
| WO | WO 2004/086363 A2 | 7/2004 | |
| WO | WO 2006/080772 | * 12/2005 | G06F 17/00 |
| WO | WO 2006/110213 A2 | 10/2006 | |

OTHER PUBLICATIONS

Corner, Douglas et al., "Operating System Design vol. 1: The Xinu Approach," Englewood Cliffs, New Jersey, Prentice Hall, 1989, pp. 308-309.
USPTO, "Final Office Action," mailed in U.S. Appl. No. 11/531,448 on Mar. 26, 2009, 13 pages.
USPTO, "Office Action," mailed in U.S. Appl. No. 11/534,448 on Apr. 21, 2008, 9 pages.
USPTO, "Office Action," mailed in U.S. Appl. No. 11/531,448 on Aug. 14, 2007, 17 pages.
Humer, Caroline, "Students Set to Hit the Latest E-Books," http://msnbc.com/id/4846005/, Apr. 27, 2004, 5 pages.
SanDisk Secure Content Solutions, Inc., "BookLocker™ Secure Digital Books," Product Description, 2005, 4 pages.
SD Group, "Simplified Version of: Part 1 Physical Layer Specification Version 1.01," dated Apr. 15, 2001, 32 pages.
"Universal Serial Bus Specification," revision 2.0, dated Apr. 27, 2000, 84 pages.
Institute of Electrical and Electronics Engineers (IEEE): "IEEE Standard for a High Performance Serial Bus," document No. IEEE 1394-1995, 97 pages.
Institute of Electrical and Electronics Engineers (IEEE): "IEEE Standard for a High Performance Serial Bus, Amendment 1," document No. IEEE Std. 1394a-2000, 11 pages.
Institute of Electrical and Electronics Engineers (IEEE): "IEEE Standard for a High Performance Serial Bus, Amendment 2," document No. IEEE Std. 1394b-2002, 53 pages.
"SanDisk TransFlash Memory Module—The Small, Scalable, Semi-removable Solution for Next-Generaiton Embedded Flash Data Storage Application," *SanDisk Flash Data Storage, SanDisk Corporation*, 4 pages.
"Memory Stick Media Formats," www.memorystick.com/en/ms/variety.html, pp. 1-3, Feb. 1, 2005.
Edited by Bill Cope and Robin Freeman, "Digital Rights Management and Content Development: Technology Drivers Across the Book Production Chain, from Creator to Consumer," RMIT University, 2001, whole book (pp. v.-166).
Lesley Ellen Harris, "Digital Property Currency of the 21$^{st}$ Century," published McGraw-Hill Ryerson Ltd, 1998, whole book (pp. vi-230).
National Research Council, "The Digital Dilemma, Intellectual Property Rights and the Emerging Information Infrastructure," National Academy Press, Washington D.C., 2000, whole book (pp. v-340).

(56) References Cited

OTHER PUBLICATIONS

Lawrence Lessig, "The Future of Ideas," Random House 2001, whole book (pp. vii-352).
Carol Riser, "Technological Protection Measures (Anti-Circumvention Devices) and Their Relation to Exceptions to Copyright in the Electronic Environment," http://www.ipa-uie.org/events/bookfairs/fhf2000/crisher.html, Oct. 20, 2000, 6 pages.
Mike Godwin, "A Cop in Every Computer," IP Worldwide, http://www.law.com, Jan. 14, 2002, 5 pages.
Mark Walter et al., "DRM: 'Down-Right Messy' and Getting Worse," The Seybold Report, Analyzing Publishing Technologies, vol. 1, No. 3, pp. 5-15.
Renato Iannella, "Digital Rights Management (DRM) Architectures," D-Lib Magazine, vol. 7, No. 6, Jun. 2001, 10 pages.
Joshua Duhl et al., "Understanding DRM Systems—An IDC Whitepaper," www.idc.com, pp. 1-25.
Patricia Evans, "DRM: Is the Road to Adoption Fraught With Potholes?" The Seybold Report, vol. 1, No. 14, Oct. 22, 2001, pp. 1-3.
Richard Eoin Nash, "A Tale of Two E-media Hosts," http://www.hostingtech.com/sp/02_06_sp_tale_print.html, Jun. 2002, pp. 1-3.
Dennis Fowler, "Digital Rights (and Wrongs)," NW, Jun. 2002, pp. 26-31.
Bill Pearson, Technical Marketing Engineer, "Digital Transmission Content Protection," presented Jun. 16, 1999 at Intel Corporation, pp. 1-25.
Jaehong Park et al., "Towards Usage Control Models: Beyond Traditional Access Control," SACMAT'02, Jun. 3-4, 2002, Monterey, CA, pp. 57-64.
Ingernar J. Cox, "Watermarking and Digital Rights Management," NEC Research Institute, Princeton, NJ, Mar. 20, 2001, pp. 1-14.
Eric Knorr, "Content Rights and Wrongs," http://Techupdate.zdnet.com, Dec. 4, 2001, pp. 1-2.
Mark Stamp, "Digital Rights Management: The Technology Behind the Hype (Draft)," Jun. 6, 2002, pp. 1-15.
Bill Trippe, "XrML and Emerging Models of Content Development and Distribution," The Gilbane Report, Apr. 23, 2002, pp. 1-16.
Mark Walter, "Authentica, Alchemedia Apply DRM to Corporate Intellectual Property," The Seybold Report, vol. 1, No. 12, Sep. 17, 2001, pp. 1-4.
Nic Garnett, "Digital Rights Management, Copyright, and Napster," Jun. 2001, pp. 1-5.
Nic Garnett and Tomas Sander, "Fair Use by Design—Session 3: What DRM can and cannot do and what it is or isn't doing today," 12$^{th}$ Conference on Computers, Freedom & Privacy, San Francisco, Apr. 16-19, 2002, 6 pages.
Joshua Duhl, "Sony Licenses InterTrust's DRM: What Does It Mean?" IDCFlash, Jun. 2002, pp. 1-4.
Dr. John Manferdelli, "Digital Rights Management("DRM")" Unified DRM Group, Microsoft Corporation, Symposium on Embeded Security, 2001, pp. 1-26.
Martha Nalebuff, "Publisher's Dilemma," Unified DRM Core at Microsoft Corporation, Seybold, Apr. 10, 2001, pp. 1-6.
Amy Carroll et al., "Microsoft Palladium: A Business Overview," Microsoft Content Security Business Unit, Jun. 2002, pp. 1-9.
Gordon Lyon, "The Internet Marketplace and DRM,"Convergent Information Systems Division, NIST, Jul. 12, 2001, pp. 1-12.
Michael Calvert, "Content Management—Timetable for Digital Rights Management," InSide Gartner This Week, No. 2, Jul. 18, 2001, pp. 1-3.
Kim Zwollo, "Digital Document Delivery and Digital Rights Management," IOS Press, 2001, pp. 9-11.
Olin Sibert, "Digital Rights Management: The Future Is Secure Hardware," Electronic Design, vol. 48, i10, May 15, 2000, p. 56.
Info-Tech Advisor Newsletter, "Digital Rights Management 101," Jun. 26, 2001, pp. 1-2.
"Fair Usage Called Key to Digital Rights Management," Communications Daily, v 22, i25, Feb. 6, 2002, pp. 1-2.
"Lack of DRM Standards Impeding Broadband Demand," Audio Week, v. 13, i51, Dec. 24, 2001, pp. 1-2.
Linden deCarmo, Media Alert—New Digital Rights Technologies Protect Content Creators' Interests, But What About Users' Rights? PC Magazine, Jun. 26, 2001, pp. 1-5, 80.
Harvey Ardman, "Will DRM Make Digital Publishing More Profitable?" Seybold Seminars, Boston, Apr. 2001, pp. 1-2.
Susan Marks, "Staking Out Digital Rights; Digital Rights Management Software Addresses the Thorny E-Comm Problem of Sharing Content While Protecting Intellectual Property," Network World, Feb. 18, 2002, pp. 1-2. 70.
Robert Bolick, "Pricing Digital Content," Professional Book Group, The McGraw-Hill Companies, Mar. 11, 2001, pp. 1-8.
Yuval Levin, "Talking to ourselves," Liberzine.com, Sep. 6, 2000, pp. 1-3.
Clifford Lynch, "The Battle to Define the Future of the Book in the Digital World," First Monday, May 2001, pp. 1-49.
Richard Stallman, "The Right to Read," GNU Project—Free Software Foundation (FSF), Feb. 1997, pp. 1-5.
"The Digital Millennium Copyright Act of 1998," (DMCA) Pub. L. No. 105-304, 112 Stat. 2860, Dec. 1998, pp. 1-18.
"Doesn't Everybody Do It?—Internet Piracy Attitudes and Behaviors," A report on a survey conducted by SIIA and KPMG—Fall 2001, pp. 1-32.
"IIPA 2000-2001 Estimated Trade Losses Due to Copyright Piracy," International Intellectual Property Alliance (IIPA), Apr. 30, 2002, pp. 1-2.
Ipsos-NPD, "Briefing: The Online Book Marketplace," May 2001, 33 pages.
Terje Hillesund, "Will E-books Change the World?" First Monday, per-viewed journal on the internet, Sep. 14, 2001, pp. 1-21.
George Alexander et al., "The Road Ahead: Problems Facing the Publishing Industry Today," The Seybold Report, Apr. 22, 2002, vol. 2, No. 2, pp. 3-9.
John Markoff, "Fears of Misuse of Encryption System Are Voiced," New York Times, Jun. 20, 2002, pp. 1-3.
"Trusted Computing Platform Alliance (TCPA)," TCPA Design Philosophies and Concepts, Version 1.0, Copyright 2000 Compaq Computer Corporation, Hewlett-Packard Company, IBM Corporation, Intel Corporation, Microsoft Corporation, Jan. 25, 2001, pp. 1-30.
Joshua Piven, "Tech vs. Tinseltown," Computer Technology Review, Los Angeles, May 2002, pp. 1-4.
"The Need for a Rights Language," Technical White Paper, Version 1.0, ContentGuard 2001, pp. 1-12.
"Extensible Rights Markup Language (XrML) 2.0 Specification," Part 1—Part V, ContentGuard, Nov. 20, 2001, 154 pages.
"Digital Rights Management for Ebooks: Publisher Requirements," Version 1.0, Association of American Publishers (AAP), Nov. 27, 2000, pp. 1-66.
USB Implementers Forum, "Universal Serial Bus Mass Storage Class, UFI Command Specification," Revision 1.0, Dec. 14, 1998, pp. 1-53.
Office Action issued Apr. 21, 2008 in U.S. Appl. No. 11/531,448 (7 pgs).
Office Action issued Feb. 9, 2012 in corresponding EP Appl. No. 07 842 209.4 (8 pgs).
"Sandisk BookLocker aka FlashCP DRM/Based USB Stick," Colin Dunstan & Flauzon, Internet Article, Jun. 29, 2005, 1 page.
"BookLocker," SanDisk, Internet Article, Feb. 6, 2005, XP002484733, 1 page.
"Sandisk Frees Students from Heavy Backpacks," Press Release (Online), Jun. 28, 2005, 1 page.
"Sandisk Introduces Ultra II SD Plus, a Dual-Purpose SD Memory Card with Built-In USB Connectivity," Press Release (Online), Feb. 19, 2005, XP002484735, 1 page.
Notification of Transmittal of the International Search Report and Written Opinion of the International Searching Authority, or the Declaration, International Application No. PCT/US2007/078105, mailed Jun. 27, 2008, 16 pages.

\* cited by examiner

APPARATUS FOR TRANSFERRING LICENSED DIGITAL CONTENT BETWEEN USERS

CROSS REFERENCE TO RELATED APPLICATION

This application is related to U.S. patent application Ser. No. 11/531,448 of Gidon Elazar, Dan Harkabi and Nehemiah Weingarten, entitled "Marketplace for Transferring Licensed Digital Content," filed Sep. 13, 2006.

BACKGROUND

This invention generally relates to the field of digital rights management, and more particularly, to methods of transferring rights in licensed digital content in accordance with a digital rights policy in the content.

The Internet worldwide network, as well as other data communication networks, enables many digital appliances to interconnect and exchange information. Digital appliances include personal computers, laptop computers, tablet computers, personal digital assistants (PDAs), mobile phones, MP3 players, DVD players, gaming consoles, digital recording devices such as digital cameras, and others. A particular use of the Internet, and other networks such as cable and satellite or a corporate or organization network is to distribute digital files, specifically digital content files.

A digital content file includes data which have an end use of being either viewed, listened to, read, played, executed, or otherwise utilized by an end user, and at some point prior to end use is stored and/or represented in numerical form. A digital content file may be an audio file, a video file, a software file, an electronic book, a document, a computer game or other types of content.

Digital content files are often copyrighted, thereby placing legal limitations on the distribution and end use. For example, a user may typically not create a copy of, distribute, modify, sell, and/or perform other end uses of a copyrighted digital content file, without first receiving a license or other form of permission from the copyright owner. Examples of copyrighted digital content files are commercial movies, commercial music, electronic books, software, computer games, and the like. Copyrighted digital content files are increasingly being licensed and transferred by content providers to end user purchasers over the Internet.

In order to combat downloading and sharing of copyrighted digital content by parties that are not licensed to do so, and to enforce use of digital content according to licenses, various protection methods are employed by content owners. The collective term for the control of distribution and usage of digital content is digital rights management (DRM). DRM systems typically involve cryptographic methods for the secure distribution of the content between a server of a content repository and a digital appliance. Such methods typically require the digital appliance to include an implementation of cryptographic algorithms and hold cryptographic keys in order to gain access to the content.

In many cases the software application used to provide the digital content implements some form of DRM that is engaged when the user attempts to access the digital content. One of the operations performed by such an application is the process of decrypting the content file using cryptographic methods and cryptographic keys. In order to execute such operations, the application must have access to the cryptographic methods and keys; therefore the cryptographic methods and keys must reside within the reach of the application. Typically the cryptographic methods, the keys, or both, reside within the application, in the digital content file itself, or somewhere within the digital appliance storage.

A digital appliance such as a computer or PDA is typically an open platform enabling computer programmers to develop programs for it. In some cases, software programs are developed for the purpose of hacking and locating the cryptographic keys and algorithms of a DRM system, in order to circumvent the DRM and gain access to the content. This process is generally called an "attack" and if it succeeds it is commonly referred to as a "crack" or a "hack" to the DRM system. A computer program that performs this function is referred to hereafter as a hacking program or a cracking program.

Other forms of attacks include using programming tools. For example, software debuggers track and trap the digital content information after the application has decrypted it, retrieving the "protected" information. Such information includes the digital content file and metadata describing how it is to be presented. A hacking program that cracks the application and releases this information from the DRM system enables the construction of unauthorized copies of the original digital content file.

As a countermeasure, DRM systems can use more sophisticated cryptographic schemes and code obfuscation techniques. Other methods include adding tamper resistant hardware to store the cryptographic keys. Such solutions either reveal the cryptographic key to the digital appliance in the process of decrypting the information, or internally perform the cryptographic functions but reveal the end result in a raw form that can then be accessed.

A side effect that arises from the above content protection methods is that the software application that provides the digital content takes an active part in the protection process by implementing the above mentioned cryptographic methods and code obfuscation. Since the content protection implementation must be kept secret, it can be known solely by the organization that developed the software application. Furthermore, the content itself must be amended with cryptographic keys and data that are known only to that specific implementation, making the specific software application be the only software piece that can decrypt and provide the content. By tying content to be used by a specific software application, the type and variety of digital appliances that may be utilized to use the content is limited to the type and variety of the consumer electronic appliances that the organization that developed the application decides to support.

Another method that is partially effective in preventing digital content files from being copied and disseminated without control is the streaming of digital content files such as audio and video files to users. In this scenario, files are not downloaded to be stored on a digital appliance but rather "broadcast" much like a radio program. This ensures that only a small block of the content is present on the digital appliance at each given moment. The downside of this is that a user must be connected to the streaming source or online during the entire duration of the music program or movie. Another problem with streaming is that, in contrast to a file that is saved on the digital appliance storage, a user that has paid for content that is streamed cannot access the content at all times. Another shortcoming of streaming is that programs exist today for recording the streamed content and reconstructing a digital copy of the original digital content, without creating a noticeable difference to the human eye or ear.

In a more recent development, in order to increase the protection of content data files, cryptographic keys and algorithms are stored and executed in a dedicated DRM device that is separate from the digital appliance with which it operates. This technique is described in United States patent application publication no. 2004/0039932. It is preferably carried out on commercially available memory cards or flash drives as DRM devices, which have their own processing capability. Suitable memory cards are available from SanDisk Corporation, the assignee hereof, which include those sold under trademarks CompactFlash (CF), Multi-Media Card (MMC), Secure Digital (SD), MicroSD and Memory Stick PRO. These memory cards are removably connected with digital appliances through mating connectors that are different for most cards. SanDisk Corporation flash drives, sold under the Cruzer trademark, contain a plug according to the Universal Serial Bus (USB) standard, so can be plugged directly into any digital appliance having a USB receptacle.

A product and service utilizing dedicated DRM devices to store books and other documents are provided by SanDisk Corporation under its trademarks BookLocker and FlashCP. An end user typically downloads data of books and documents from the Internet into a DRM device, which is a flash drive, through a digital appliance to which it is connected. The data are stored in a portion of the non-volatile flash memory of the DRM device that is not accessible by a digital appliance to which the DRM device is connected. Rather, the data are accessed by the processor internal of the DRM device, and then sent to the digital appliance one page at a time for display to the end user. This generation of document page images makes it very difficult for an unauthorized copy of the documents data files stored in the DRM device to be made.

When a book is purchased, data of the book are downloaded into an end user's DRM device. In addition to receiving data of the book content, the end user receives data of a license that has been purchased to use the book, and this license is also stored in the non-volatile memory. The license defines the rights of the end user in the data content. The book may be read by the end user, within the terms of the license, when the DRM device into which data of the book are stored is connected with a digital appliance having a suitable visual display. Rights to use the data content are not limited to any specific digital appliance or type of digital appliance. A digital appliance with which a DRM device can be used need not retain keys, security algorithms or the like; these are contained within and processed by the DRM device.

SUMMARY

It is desirable to provide the end user a right to resell or transfer the content stored in a DRM device that mimics lawful transfers of the content when embodied in the more traditional physical form of a book, music CD, video DVD, computer software or game CD or the like, while at the same time limiting any increased risks to the content provider of unauthorized copying and use. This is accomplished by transferring the content to a buyer's DRM device along with a suitable license to use the content while the license in the seller's DRM device thereafter limits or terminates further access to the content data stored in the seller's DRM device. A provider of the content, or some other authority that licenses the content, may become involved in the transaction by issuing the new license to the buyer's DRM device and limiting or terminating the content license in the seller's DRM device. The content provider or licensing authority then may share in some of the purchase price paid by the buyer, most of which goes to the seller. Alternatively, the original license in the seller's DRM device may allow transfer to the buyer's DRM device without having to obtain permission from or involve the content provider or licensing authority. In this case, the original license automatically changes after transfer of the content to limit or terminate rights of the seller to access the content in his or her DRM device. In addition to or in place of modifying or deleting the license in the seller's DRM device for the transferred content, the transfer process can be made to include erasing the content from the memory of the seller's DRM device but this is typically not necessary as a digital rights management matter because of the high degree of security that the DRM device provides to the content. The content cannot be read out of the DRM device by a connected digital appliance except as permitted by the license that is also stored therein.

Additional aspects, advantages and features of the present invention are included in the following description of exemplary examples thereof, which description should be taken in conjunction with the accompanying drawings.

All patents, patent applications, articles, standards, books, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

DETAILED DESCRIPTION OF EXEMPLARY EMBODIMENTS

DRM Devices and their Operation

Figure 1:
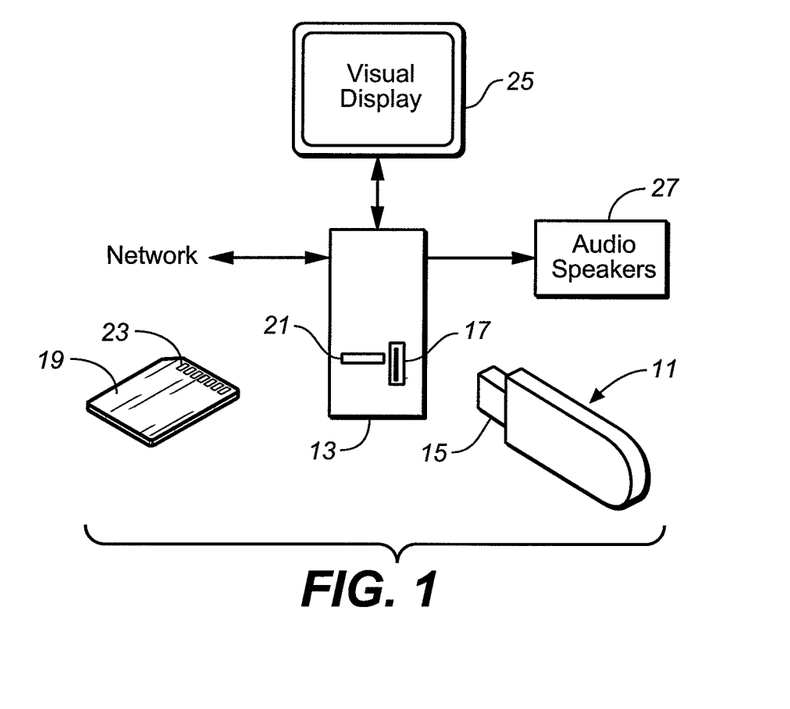
FIG. 1 illustrates use of two types of DRM devices with one variety of digital appliance.

A common form of DRM device 11 and digital appliance 13 are shown in FIG. 1. The DRM device 11 is a flash drive having a USB plug 15 for removable insertion into an USB receptacle 17 on the digital appliance 13, which will commonly be a personal computer, notebook computer or other host that contains an USB receptacle. Of course, other digital appliances may provide similar connectivity for other forms of the memory device. Alternatively, the plug 15 may be in the form of a FireWire connector. Further, wireless communication may be used between the digital appliance 13 and DRM device 11 instead of a wired connection between them.

The use of an SD card 19 as the DRM device is also illustrated in FIG. 1, being removably insertable into a card slot 21 of the digital appliance 13 to electrically connect with its external contacts 23. Some form of memory card adaptor, such as one that also plugs into a USB receptacle of a digital appliance, may be employed instead of utilizing a dedicated card slot on the digital appliance itself.

Another memory storage device very useful for the DRM device is a memory card having two different external connectors on the card that both connect to the internal memory controller, one for insertion into a USB receptacle and another with a standard set of card contacts, such as according to the SD card standards. Such a device is described in United States patent application publication no. 2005/0230484A1, entitled "Memory Cards Having Two Standard Sets of Contacts," and application publication no. 2006/0084287A1, entitled "Memory Card with Two Standard Sets of Contacts and a Contact Covering Mechanism." Such memory cards may also utilize a wireless data communications interface with a host system, either in addition to the two sets of contacts or in place of one or both of them.

Any visual content of data stored in the DRM device may be viewed by the user on the digital appliance's visual display 25, and any audio content heard through audio speakers 27 or earphones. The digital appliance 13 may include only one of the display 25 or the audio source 27, or multiple copies of one of them, if dedicated to reproduce only visual or audio content, respectively. Some other human sensory transducer may be used as part of the digital appliance 13 when appropriate for reproducing data of a content file stored in the DRM device. The DRM device most commonly contains no visual, auditory or other human sensory transducer for reproducing the content data stored in it but rather typically relies upon the digital appliance for those functions.

Content files and other data are downloaded into the flash memory within either of the devices 11 or 19 through the digital appliance 13 to which they are inserted, when the digital appliance is connected to the Internet or some other network communicating with a source of such data. Alternatively, the DRM device may obtain content from a digital appliance that does not have either a visual display 25 or audio speakers 27 but is somehow connected to the network, such as by wireless Internet access through a HotPoint switch.

Figure 2:
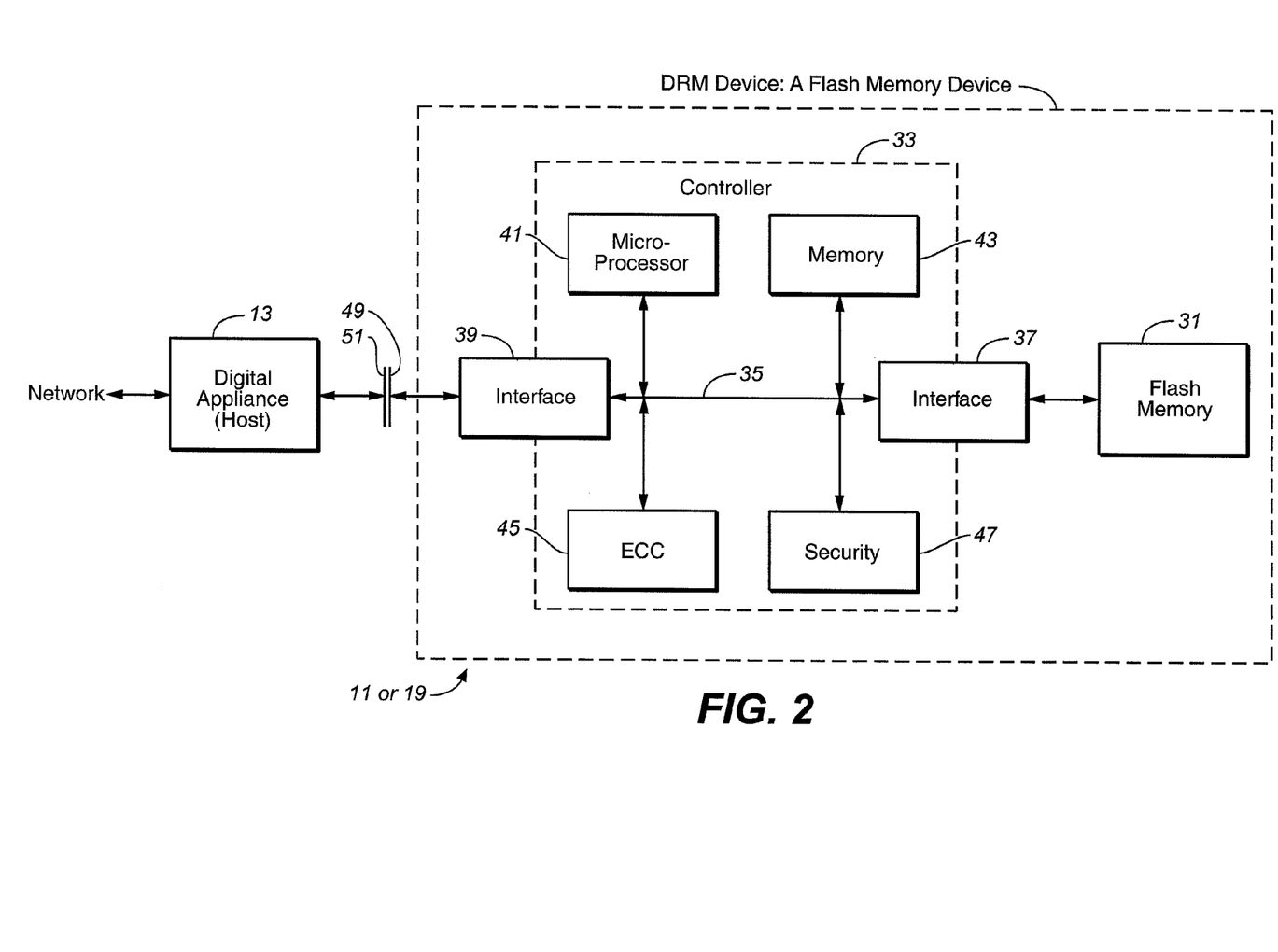
FIG. 2 is an electronic block diagram of an example DRM device such as those shown in FIG. 1.

The electronic functions of such a flash memory device 11 or 19 are generally illustrated in FIG. 2. The device contains flash memory 31 having an array or arrays of flash memory cells formed on one or more semiconductor integrated circuit chips. A memory controller 33, usually formed on another chip, typically includes a bus 35 extending between an interface 37 with the flash memory 31 and an interface 39 of the device. Connected to the bus 35 are a micro-processor 41, a memory 43, including volatile random-access-memory (RAM), and typically one or more circuits for making special purpose calculations, such as a circuit 45 for calculating error correction codes (ECCs) from the data and a security processing circuit 47. An external connector 49 is formed on an outside of the memory device, with a mechanically and electrically mating connector 51 on or communicating with the digital appliance 13. Of course, if the device 11 or 19 is wireless, the external connectors 49 and 51 do not exist but rather are replaced by antennas of the DRM device and digital appliance, which interface the two in a manner providing an operable connection for transferring data between them.

The form of the connector 49 is specific to the standard for the particular memory card or flash drive being used as the DRM device. Many such standards exist. For example, a public document describing the physical and some electrical characteristics of the SD Card is available from the SD Association (SDA): "Simplified Version of: Part 1 Physical Layer Specification Version 1.01," dated Apr. 15, 2001. Specifications of the TransFlash memory card are available from SanDisk Corporation. Mechanical and electrical details of the USB interface are provided by the "Universal Serial Bus Specification," revision 2.0, dated Apr. 27, 2000. Another, higher transfer rate interface, known as FireWire, is specified by the following standard of the Institute of Electrical and Electronics Engineers (IEEE): "IEEE Standard for a High Performance Serial Bus," document no. IEEE 1394-1995, as amended by document nos. IEEE 1394a-2000 and IEEE 1394b-2002.

It is also desirable to manufacture the DRM device in a manner that makes it difficult to be disassembled. This provides additional security of the data stored in it. One such manufacturing technique and a flash drive resulting from it are described in United States patent application publication no. 2004/0137664A1.

The description above contemplates that the DRM device is implemented in the form of a memory card or flash device that is removable from the digital appliance. However, there are applications where it is desirable to permanently install the DRM device within a digital appliance, an example being where the digital appliance is highly portable such as an audio MP3 player. In such a case, the DRM device is preferably separately formed in a sealed package to increase the difficulty of it being disassembled, thereby increasing the security of the data being processed.

The microprocessor 41 of the controller 33 (FIG. 2) manages operation of the flash memory 31, interfaces with the digital appliance 13, handles the flow of data between the two and processes or supervises the processing of data flowing between the two. The flash memory 31 may be operationally divided in the manner shown in FIG. 3, either physically, logically or with a combination. A segment 55 may be provided for general data storage and, if provided, the digital appliance 13 is allowed by the controller 33 to address this portion of the memory for the general storage of data therein. Another portion 57, the remainder of the memory space in this example, is configured to be inaccessible by the digital appliance. Rather, the hidden portion 57 is accessible by the controller 33 as necessary to carry out requests and commands of the digital appliance 13. The controller 33 has access to the hidden portion 57 of the flash memory in order to perform its functions but this portion is not within the logical address space of the memory device that is seen by the digital appliance 13.

Figure 3:
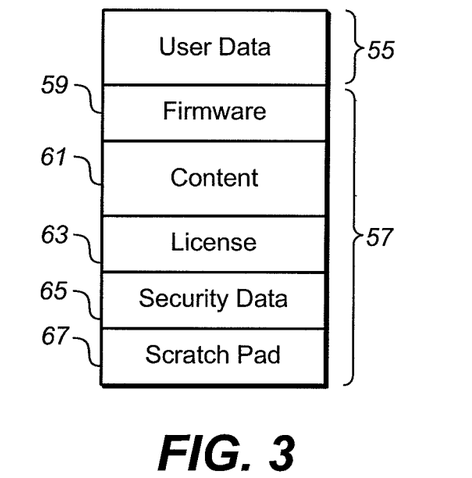
FIG. 3 shows an example division of non-volatile memory in the DRM device of FIG. 2.

A memory segment 59 may be provided within the hidden portion 57 to store firmware that controls operation of the controller 33. Firmware is loaded from the flash memory 31 into the controller memory 43 as necessary, and then executed out of the memory 43 by the microprocessor 41. Another segment 61 may contain data of the content desired to be retrieved by the digital appliance 13 but these data are transferred to the digital appliance after processing by the controller 33. Data of a license that establishes rules for access and use the content may be stored in a segment 63. Another hidden segment 65 may be provided to store data of encryption keys, a serial number or other unique identification of the device and other security data used to download content data into the memory portion 57 and/or in the retrieval and use of those data by the digital appliance. An additional hidden memory segment 67 may also be included for use by the controller to temporarily store intermediate results of its processing that cannot be accessed by the digital appliance 13.

As an alternative to storing the content 61 in the hidden portion 57, it may be stored in an encrypted form in the memory portion 55 that is accessable by the host within the logical address space of the memory. Other items shown in FIG. 3 to be within the hidden portion 57 may be similarly treated. Indeed, with adequate encryption, there may be little or no hidden memory capacity.

A wide variety of types of content data exist that may be stored in the memory segment 61. Data of books, magazines and other documents are examples for which the DRM device is quite useful. Data of music, lectures, books and other audio sources can also be stored in a DRM device. Various forms of visual data may also be stored as content, including that of still pictures, movies, television shows and the like. The DRM device may also be used to store data of games or various software applications. In general, any type of data that a user may want to access or use may be stored as content in the DRM device. The DRM device described herein allows the provider of the content to control its use so that the provider may obtain revenue in exchange for allowing its use.

Content may typically be downloaded into the memory segment 61 over the Internet, or some other computer network, through a digital appliance to which the DRM device is connected. License data that specifies allowed use of the content are downloaded into the memory segment 63 in the same manner. License data are usually downloaded as part of the downloading the content, to establish restrictions on the use of the accompanying content. Examples of license restrictions include dates or times that access to the content is permitted, a date that the license terminates, conditions for continuing the license in force and whether the content may be transferred to another DRM device. The controller of the DRM device utilizes the license data to control whether content requested by a user is rendered or not. But what is not controlled is the host or other digital appliance which may be used to retrieve data from the DRM device. Since the DRM device, and thus the content stored on it, are highly portable, its owner may use a wide variety of digital appliances in various locations to access the stored content. The license granted to the user is not restricted to any one digital appliance.

Transfers of content and license data are preferably made over the Internet in an encrypted manner but may be decrypted within the DRM device before being stored in it. Although the content data may be stored in an encrypted form, the inaccessibility by a digital appliance of the memory segments in which they are stored protects the content and license data from unauthorized access, even if stored in an unencrypted form. They are accessed only by the controller, which then renders the content to the digital appliance without encryption but in a form that is not particularly useful to someone who wants to copy the content data from the DRM device without permission.

The various types of data stored in the DRM device need not necessarily be segmented in the manner of the example shown in FIG. 3. The various types of data may be scattered within the memory, rather than being stored in specific segments. Moreover, the data may be fragmented, such as by storing pieces of the license within pieces of the content. Data may also be stored in areas that are not hidden from the user, so long as the user cannot gain access to the data, such as is the case when the data are encrypted. Further, the content data and the license data may be stored differently, one in a portion of the memory hidden from access from outside of the DRM device and another in an externally accessible portion but in an encrypted form. The data stored in the hidden memory portion generally need not be encrypted but may be. In one specific example, the content data are stored in an encrypted form in an externally accessible portion of the memory while the license data are stored in a hidden portion of the memory without encryption. Further, only part of the stored data may be accessible at defined points in time, such as the content without its license or vice versa.

Figure 4:
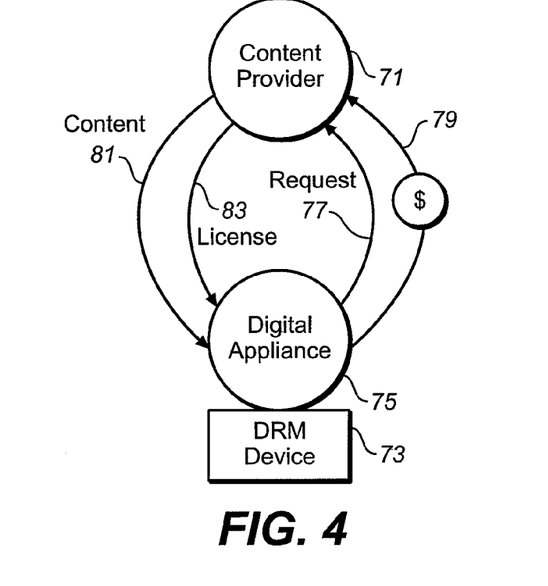
FIG. 4 illustrates a method of downloading content into a DRM device from a central provider of the content.

FIG. 4 illustrates the transaction resulting in downloading of new content data from a content provider 71 to a DRM device 73 through a digital appliance 75 to which the DRM device is connected. The DRM device 73 is like the devices 11 or 19 described with respect to FIG. 2. The end user sends a request 77 from his or her computer or other digital appliance 75 over the Internet to the content provider 71 to receive data of a particular item of content. A transfer 79 of funds to pay for the license is also sent, by use of a credit card or some other funds transfer. In return, the requested content 81 and accompanying license 83 are transmitted over the Internet to the digital appliance 75 and stored in the DRM device as illustrated in FIG. 3. Alternatively, the content and license may be obtained from different providers.

Figure 5:
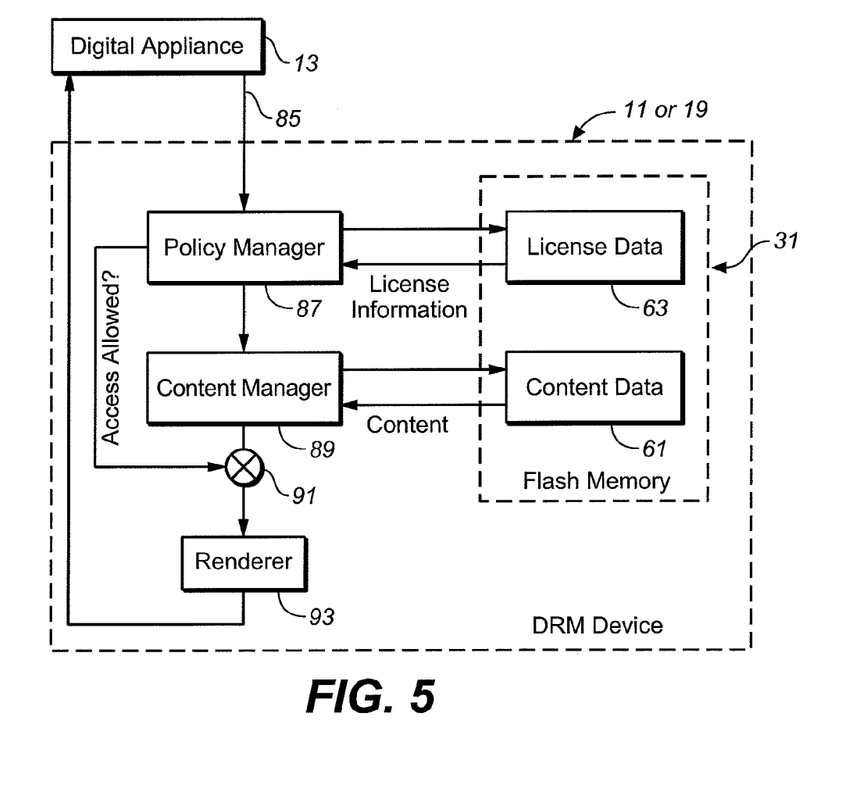
FIG. 5 provides an example of the operation of the DRM device of FIG. 2 to retrieve data of content stored therein.

The content so stored in the DRM device 11 or 19 may be utilized in the manner illustrated in FIG. 5, wherein certain functional operations of its controller 33 (FIG. 2) executing its firmware are illustrated. In response to a request 85 from the digital appliance 13 for access to an item of content stored in the flash memory 31, a policy manager 87 accesses the license data stored in the region 63 of the flash memory. The policy manager 87 then determines whether the requested access is in accordance with the permission granted by the license associated with the accessed content. A content manager 89 also accesses the requested content from the region 61 of the flash memory. If the policy manager 87 determines that the requested access is in accordance with the terms of the license, then the data of the requested content are allowed at 91 to pass to a rendering operation 93 to be prepared for output to the digital appliance 13. But if the policy manager 87 determines that access is not permitted by the license, then the access operation stops and an appropriate message sent to the digital appliance 13 to communicate this fact to the end user.

The rendering operation 93 performed by the controller 33 of the DRM device preferably provides an output of the content data to the digital appliance 13 to which it is connected that allows the end user to gain the benefit of the purchased license but which at the same time is not in a form useful for unauthorized copying of the accessed content data. A small portion of the content data are sent to the digital appliance 13 at a time and in a form that makes it difficult or impractical to aggregate together to recreate the content data file. The DRM device preferably arranges the presentation of the content data for the digital appliance, rather than sending the entire data file in a form that can be copied. This provides significant protection against copying the content data file by what is output in an unencrypted form from the DRM device.

For example, if the content is a book, magazine or other document, the rendering operation 93 sends a picture to the digital appliance 13 of one page at a time, such as in the form of a bit map image. This is all the end user requires in order to be able to read the document but security is maintained since this output is not particularly useful to someone who wants to copy the data being rendered. An unauthorized copier would prefer access to the data as stored in the flash memory 31, an entire data file in some conventional format, rather than having to assemble bit maps of each page into such a file. Similar limited renditions may also be provided at the output of the DRM device for other types of content data.

Transfer of Licensed Digital Content Between Users

In order for the business in content in digital form to be more analogous to content in physical forms, such as books, CDs, DVDs, and software or game CDs, the digital content needs to be transferable from one user to another, just as a purchaser of a book, CD or DVD may resell that item to another. A goal of the techniques described herein is to allow a licensee of copyrighted digital content to effectively transfer that content to another in a way that parallels operation of the existing markets in corresponding used physical items such as books, CDs and DVDs.

FIGS. 6-9 illustrate several such systems. In each of these examples, digital content and license data controlling its use have been downloaded in the manner illustrated in FIG. 4 from a content provider into a DRM device 101 of the type described with respect to FIGS. 1, 2, 3 and 5. This digital content has most likely been rendered through a digital appliance 103, to which the DRM device 101 is connected for this purpose, in the manner permitted by the license. The end user "seller" who possesses the DRM device 101 and initially purchased the rights to the content now wishes to sell the content to another end user as a used item. This other end user "buyer" who desires to purchase the content has a DRM device 105 that can store the digital content and license data through a digital appliance 107.

In most of the example systems shown in FIGS. 6-9, a central authority 109 is in some manner involved in the transaction between the buyer and seller. Such an authority can act to control and maintain the individual user licenses with regard to digital content stored in various DRM devices. For this purpose, the authority 109 may most commonly maintain the digital content and the license data on one or more servers that are used to enable the "used" content sale. The authority 109 may include the content providers or an entity that acts as an agent for the content providers for the purpose of licensing their copyrighted works. The central authority 109 may require a portion of the resale price as a condition of permitting and possibly facilitating the transfer from one user to another.

Figure 6:
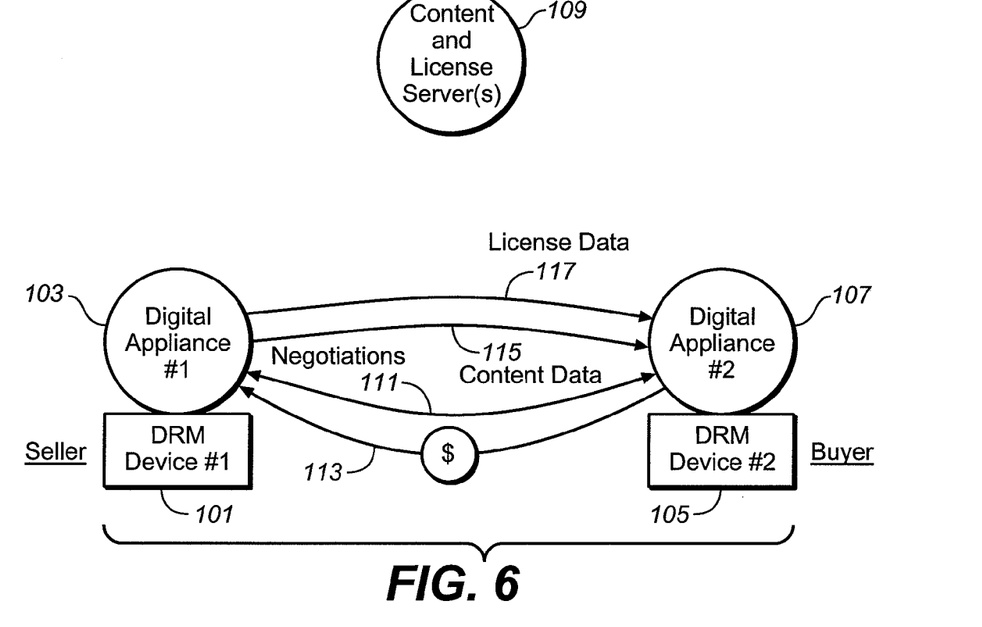
FIGS. 6-9 illustrate different ways of transferring rights in content from the DRM device of one user to that of another user.

In the used content transfer example of FIG. 6, however, such an authority 109 is not involved in the content transfer. The transaction takes place directly between the DRM devices of the buyer and seller. In this case, the license stored in the DRM device 101 that controls use of the content data also stored therein allows the user of that device to transfer the content and a license to use it without seeking further permission of the content provider or the authority 109, although perhaps with some restrictions. Examples of such restrictions are a limited number of times the associated content data may be copied, a defined period of time when that is permitted, and the like. The willing seller and buyer find each other through a posting on a suitable Internet web site, facility provided by the content provider as part of its content store, print advertising, or the like, and then negotiate a price and other terms of the sale of the "used" digital content, as indicated by a path 111. The transaction is completed by the buyer sending the purchase price to the seller, as indicated by the path 113, and the seller transmitting the content data and license to the buyer, as indicated by the paths 115 and 117. Alternatively, the price can be fixed by the terms of the original license to the seller, and/or a transfer to a specified one or more number of friends or relatives of the seller can be allowed for free.

In response to completion of this transaction, the state of the license in the seller's DRM device 101 may then automatically change the rights use by the seller of the content data stored therein, such as by terminating that license. When the rights of use by the DRM device 101 are terminated at about the same time the DRM device 105 acquires the content and license to use it, the transaction is similar to the selling of a book, CD, DVD or other physical version of the content. Alternatively, the order of events may be somewhat different than this, such as by the state of the license changing before the transaction is completed and then, if not completed, changing back to its original state.

Further, the original license may allow the original purchaser to maintain his or her license to continue to utilize the re-sold content, with or without a time limit, or to even sell an additional specified number of copies, usually within some set time limit. Such retained rights are in addition to the rights of transfer that mimic the rights of an owner of a physical book, audio CD, video DVD or other form of content. The license data stored on the DRM device 101 specify such permissions and conditions, which are implemented by the DRM device firmware when executing a transfer of the content and license. The license sent to the buyer's DRM device 105 is included as part of the original license stored in the seller's DRM device 101, and the initial cost of the license and content to the user of the DRM device 101 will commonly depend on the extent of any such re-licensing rights.

The content and license data are typically transmitted from the DRM device 101 through the seller's digital appliance 103 and over the Internet or some other network to the DRM device 105 through the buyer's digital appliance 107. The digital appliance typically contains software that implements this transfer. The firmware stored in the DRM devices then enables this transfer to occur, even though the memory space storing the content and license data are hidden or otherwise inaccessible by a connected digital appliance. The transmission is preferably encrypted within the seller's DRM device 101, such as by use of an algorithm stored in the hidden portion 65 (FIG. 3) of its memory and a security key from the memory portion 65 of the buyer's DRM device 105. The received encrypted content and license may then be decrypted within the receiving DRM device 105 and stored in the hidden regions 61 and 63 of its memory.

Figure 7:
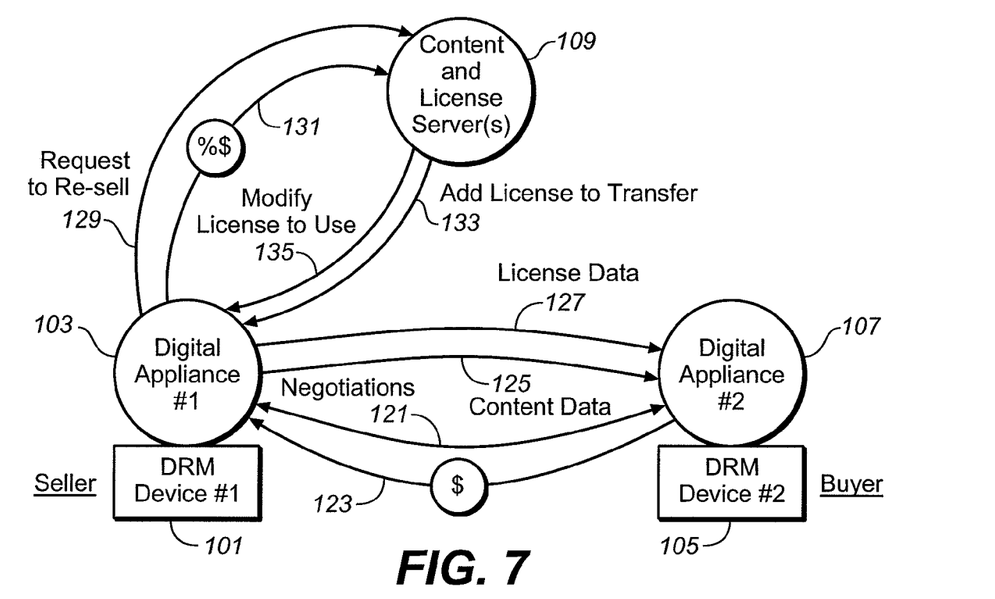

Another example of transferring content is given in FIG. 7. The method is similar as between the buyer and seller as described above with respect to FIG. 6. Negotiations 121 take place, followed by an agreed upon amount of money being paid by the buyer to the seller, as indicated by the path 123. In response to this, the seller sends the buyer data of the content being re-sold and a license to use it, as indicated by paths 125 and 127. The difference here, however, is that the original license purchased by the seller and stored in the DRM device 101 does not allow this transaction to take place. Rather, the seller must first obtain permission from the authority 109 by making a request and paying a fee, as indicated by paths 129 and 131. The fee may be a small percentage, such as 10-20%, of that paid to the seller by the buyer (path 123), or even as high as 50% in specific situations. Alternatively, the fee to the central authority 109 may be a fixed minimum dollar amount. This fee may even be zero in the case of an authorized transfer, such as one to a friend or relative, by barter or otherwise.

The authority 109 in the embodiment of FIG. 7 then sends to the DRM device 101, as shown by a path 133, a license to transfer the content stored in the DRM device 101 to another DRM device, which may be carried out in the same manner as described above with respect to FIG. 6. This license may authorize a one time transfer to any other DRM device, or to only the specific DRM device 105 that is referenced in the seller's request 129. The license in the DRM device 101 is typically modified at the same time, as indicated by a path 135. This modification may terminate the seller's right to any further use of the content, may place a time limit on any further use, or provide other restrictions. Alternatively, the seller may be permitted to continue to use the content without any limitations not already in the original license, wherein the license modification 135 does not take place. Additionally, a license may be sent by the authority 109 to the DRM device 105 in order to enable the buyer's use of the transferred content data.

The embodiment of FIG. 7 may be modified to have payment made by the buyer to the authority 109, and then a portion, usually a majority, of that payment is returned to the seller. The request for authorization of the sale may then come to the authority 109 from either the buyer or the seller. It is also possible to make the original license silent on what may be done with the content after the first use, just like the case of a physical book that has been purchased. In an electronic distribution case, however, the authority 109 may prevent transfer of the content until re-licensing information is obtained from it, usually upon some sort of payment by the seller to the authority 109.

Figure 8:
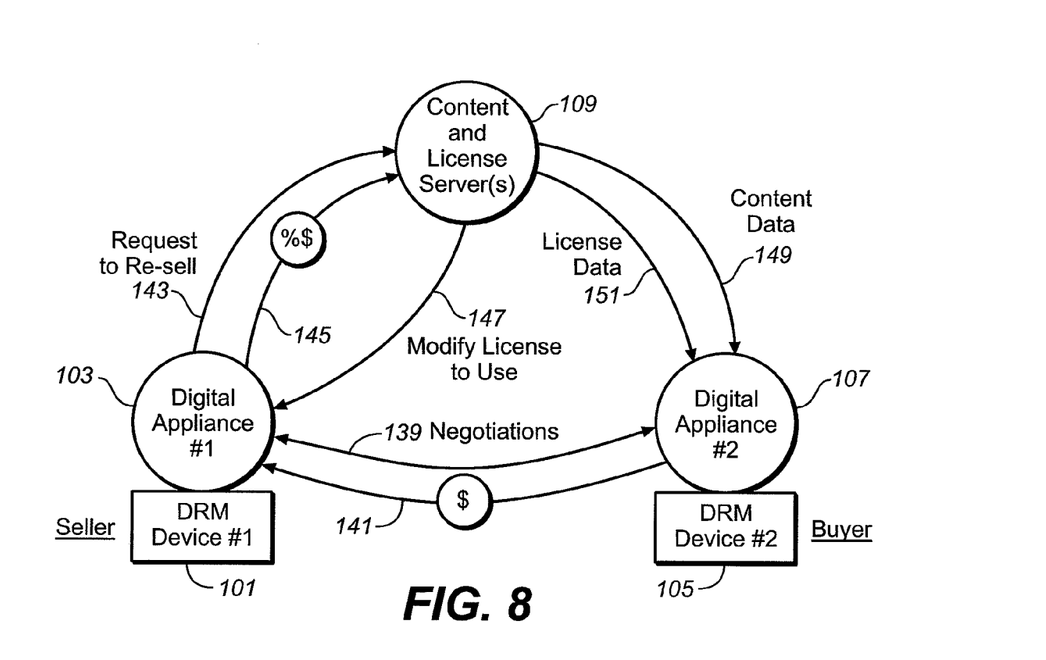

In another embodiment illustrated by FIG. 8, there are also negotiations 141 directly between the buyer and seller, and the buyer pays the seller a price for the content transfer, as indicated by a path 141. The seller also requests that the authority 109 permit transfer of the content, as shown by a path 143, and pays the authority 109 a portion of what is to be received from the buyer for the content, per a path 145. The authority 109 may also modify the license in the DRM device, as shown by a path 147. So far, the transaction of FIG. 8 is quite similar to that of FIG. 7. But instead of authorizing the seller's DRM device 101 to transfer the content and license to the buyer's DRM device 105, the authority 109 directly transfers these to the DRM device 105, as shown by paths 149 and 151. In this case, and likely in the others as well, the authority 109 maintains all the licensed content in large mass memory servers. The license data, identification of licensed DRM devices and their owners, and other data, may also be maintained by the authority 109 on the same or additional servers. The same authority 109 may also be the source 71 (FIG. 4) of original downloads of content and license data.

Figure 9:
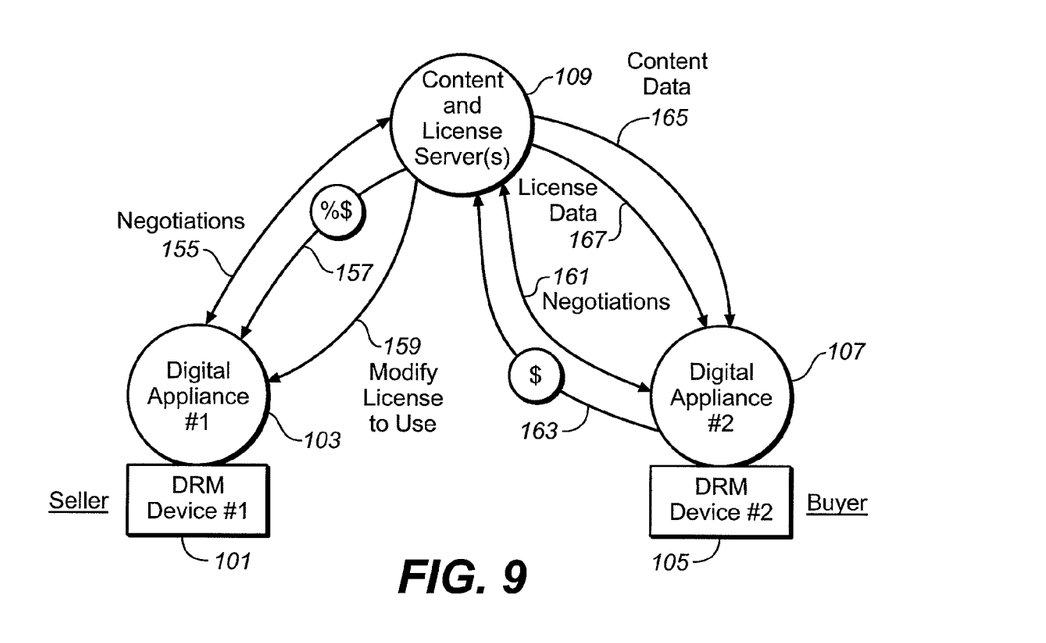

In the transactional embodiment of FIG. 9, the buyer and seller both deal with the authority 109 and not with each other. The seller contacts the authority 109 when he or she wants to re-sell the content back to the content provider. This is indicated by a path 155, and an agreed upon amount is paid to the seller, as shown by a path 157. The license in the seller's DRM device 101 is then modified by the authority 109, per a path 159, to render the content unusable.

The buyer initiates a request of the authority 109 to have useable used content downloaded into his or her DRM device 105. This is indicated by a path 161 of FIG. 9, and an agreed upon price is paid to the authority 109, as shown by a path 163. In response, the authority 109 sends content and license data to the DRM device 105, through the digital appliance 107, as shown by paths 165 and 167, respectively. The content and license data are stored in the DRM device 105 in the manner discussed above. The content is useable by the buyer in the manner allowed by the license.

In the case of FIG. 9, the authority 109 acts as a clearing house for the re-licensing of content that has previously been licensed. This embodiment is particularly useful in a case where there are a maximum number of copies of a given piece of content that the provider of that content is permitting to be in circulation at any one time. Once the maximum number of copies have been downloaded into individual DRM devices and licensed for use, an existing licensee needs to give up his or her license by re-selling rights back to the authority 109 before someone else may become licensed.

Further, rights in one or more of a limited number of copies of an item of content may be auctioned by the authority 109 in the business model of FIG. 9, instead of conducting the negotiations 161. The price 163 would then be established by the highest bidder, when the highest bid is accepted by the authority 109. The transfer of a block of copies of a particular content may also be auctioned to the highest bidder, such as to an intermediate re-licensing authority.

An auction may also be used in the business models of FIGS. 6-8, in place of the negotiations between the buyer and seller that are shown, to sell a single copy of a particular content. Such an auction may conveniently held on a suitable Internet site on which sellers post content to be sold and prospective purchasers submit bids, the seller usually choosing to sell the content to the highest bidder.

Another system for distributing content may emulate a library system of the type typically operated by a public entity, charity or even a commercial enterprise. The authority 109 of FIG. 9 then becomes the library, which possesses rights to "loan" a given number of one or more copies of each of a large number of items of content, such as books, audio works, videos, computer games or the like. Rights in each copy of such a work may then be "checked out" to an individual. When all copies held by the library are checked out, the library cannot loan the work to another until someone checks a copy back into the library. A transfer to an individual by the library of an item of content along with the license to use it would constitute a "check-out" of one copy of the item. A "check-in" could occur when the end-user initiates a termination of the license but more commonly could be deemed to occur upon the automatic expiration of the license upon the occurrence of some event. Such an event may be the expiration of a fixed amount of time, such as one or a few weeks, after the content and license were transferred to a particular end user. Once one of a limited number of licenses of a particular work terminates, the library is free to re-license a copy of the work to another.

The library may a record of the number of active licenses for each work, and when a request to borrow a copy of a work is received, the library then checks to see if the number of active licenses to borrowers is less than the number of copies of the work under which the library is licensed to loan. If so, the requested copy of the work may be loaned. If not, the request is denied. As soon as an active license terminates by the passage of a fixed period of time or otherwise, the library then again has a copy of the work to lend.

CONCLUSION

Although the various aspects of the present invention have been described with respect to exemplary embodiments thereof, it will be understood that the present invention is entitled to protection within the full scope of the appended claims. Particularly, modifications of the example transactions described above primarily with respect to FIGS. 6-9 may be made to accommodate other specific situations.

It is claimed:

1. A digital rights management (DRM) storage device, comprising:
   a non-volatile memory configured to store content and license data, the license data including content use data and content transfer data, the content transfer data disallowing transfer of the content to a second DRM device, via a host digital appliance, without prior consent by a third party licensing authority, and
   a memory controller,
   wherein the memory controller is configured to:
      access the content and the content use data stored in the memory in order to provide rendition of the content to the host digital appliance in accordance with the content use data;
      in response to a request via the host digital appliance for a license from the third party licensing authority, the request indicative of commanding that the DRM storage device send the content from the DRM storage device to the second DRM device, receive the license from the third party licensing authority in a license communication;

in response to receiving the license, determine, based on the content transfer data and the received license, whether to transfer the content to the second DRM device;

in response to determining to transfer the content, transmit the content through an interface for transfer to the second DRM device via the host digital appliance;

receive a modify license command in a license modification communication from the third party licensing authority, wherein the memory controller is configured to receive the license communication and the license modification communication as two separate communications;

in response to receiving the modify license command from the third party licensing authority, modify the license data based on the modify license command received via the host digital appliance in order to thereafter prevent the DRM storage device from any further use of the content; and in response to determining to not transfer the content, prohibit transmission of the content via the host digital appliance.

2. The device of claim 1, wherein the memory is partitioned into at least open and hidden portions in a manner that the content and license data are storable in the hidden portion of the memory, wherein the memory controller provides access to the open portion of the memory but not the hidden portion, and wherein the memory controller has access to the hidden portion of the memory.

3. The device of claim 1, wherein the memory is further configured to store the content and the license data in an encrypted form in a portion of the memory to which the memory controller provides access.

4. The device of claim 1, wherein the modify license command is indicative of terminating a license for use of the content.

5. The device of claim 1, wherein the interface comprises a connector having a set of electrical contacts adapted to mate with receptacles of one or more digital appliances.

6. The device of claim 1, wherein the interface comprises wireless communication adapted to operate with one or more digital appliances.

7. The device of claim 1, wherein the interface is configured to be removably inserted into one or more digital appliances.

8. The device of claim 7, wherein the interface comprises one of a USB interface or a SD interface.

9. The device of claim 1, wherein the memory controller is further configured to:

receive a request from the host digital appliance for access to the content; and determine whether to grant the request based on the content use data.

10. The device of claim 9, wherein the memory controller is configured to:

modify a form of the content in order to generate a limited rendition of a part, but less than all, of the content;

provide the limited rendition of the part of the content through the interface in response to determining to grant the request.

11. The device of claim 10, wherein the memory controller is configured to modify the form of the content by generating a bit map image.

12. The device of claim 10, wherein the content includes a plurality of pages;

wherein the memory controller is configured to modify the form of the plurality of pages into multiple bit map page images; and wherein the memory controller is configured to send the multiple bit map images through the interface one bit map page at a time.

13. The device of claim 1, wherein the memory controller is further configured to delete at least a part of the content in response to the modify license command received through the interface.

14. The device of claim 1, wherein the interface is configured to receive the content from the host digital appliance.

15. The device of claim 1, wherein the content transfer data includes a period of time in which transfer of the content is permitted.

16. The device of claim 1, wherein the content use data is indicative of not being restricted to a particular digital appliance.

17. A server configured to facilitate transfer of licensed content from a first digital rights management (DRM) device to a second DRM device, the server comprising:

one or more interfaces for communicating with the first DRM device and the second DRM device;

a tangible memory;

a hardware controller in communication with the one or more interfaces and the tangible memory, the hardware controller configured to:

receive a request originated from a first digital appliance, the request indicative of commanding that the first DRM device send the licensed content from the first DRM device to the second DRM device, the first digital appliance operatively coupled to the first DRM device, configured to conduct negotiations directly with a second digital appliance coupled to the second DRM device without communication with the server, and configured to receive payment from the second digital appliance;

in response to receiving the request:

send a license to the first DRM device in a license communication, the license to transfer the licensed content from the first DRM device to the second DRM device;

send a modify license command to the first DRM device in a license modification communication, the modify license command indicative to the first DRM device to terminate rights of the first DRM device to the licensed content so that the first DRM device is prevented from any further use of the licensed content, wherein hardware controller is adapted to send the license communication and the license modification communication as two separate communications.

18. The server of claim 17, wherein the hardware controller is further configured to receive a notice of a negotiated agreement between the first DRM device and the second DRM device to transfer rights to the licensed content.

19. The server of claim 17, wherein the hardware controller is further configured to receive payment; and wherein in response to receipt of payment and in response to receipt of the request, the hardware controller is configured to send the license in the license communication to the first DRM device and configured to send the modify license command in the license modification communication to the first DRM device.

20. The server of claim 19, wherein the hardware controller is configured to receive payment from the first digital appliance.

21. The server of claim 19, wherein the hardware controller is configured to receive payment from the second digital appliance.

22. The server of claim 17, wherein the license is indicative of the first DRM device to transfer the licensed content directly to the second DRM device.

23. The server of claim 17, wherein the license is indicative of the first DRM device to transfer the licensed content via the server to the second DRM device.

* * * * *